US012576363B2

(12) United States Patent (10) Patent No.: US 12,576,363 B2
Okawa et al. (45) Date of Patent: Mar. 17, 2026

(54) MEMBRANE TREATMENT APPARATUS

(71) Applicant: KUBOTA CORPORATION, Osaka (JP)

(72) Inventors: Yasuhiro Okawa, Hyogo (JP); Yoichi Okumura, Hyogo (JP); Hiroki Tomita, Hyogo (JP); Jun Maeda, Hyogo (JP); Hiroyuki Kobayashi, Hyogo (JP)

(73) Assignee: KUBOTA CORPORATION, Osaka (JP)

( * ) Notice: Subject to any disclaimer, the term of this patent is extended or adjusted under 35 U.S.C. 154(b) by 496 days.

(21) Appl. No.: 18/021,275

(22) PCT Filed: Oct. 11, 2021

(86) PCT No.: PCT/JP2021/037572
§ 371 (c)(1),
(2) Date: Feb. 14, 2023

(87) PCT Pub. No.: WO2022/080315
PCT Pub. Date: Apr. 21, 2022

(65) Prior Publication Data
US 2023/0294046 A1 Sep. 21, 2023

(30) Foreign Application Priority Data
Oct. 14, 2020 (JP) ................................. 2020-173503

(51) Int. Cl.
*B01D 63/08* (2006.01)
*C02F 1/44* (2023.01)

(52) U.S. Cl.
CPC ......... *B01D 63/0821* (2022.08); *B01D 63/08* (2013.01); *C02F 1/44* (2013.01); *B01D 2315/06* (2013.01)

(58) Field of Classification Search
CPC ................ B01D 63/0821; B01D 63/08; B01D 2315/06; C02F 1/44
See application file for complete search history.

(56) References Cited

U.S. PATENT DOCUMENTS

2014/0151299 A1    6/2014  Downey et al.
2016/0256832 A1*   9/2016  Okajima ................ B01D 61/20
(Continued)

FOREIGN PATENT DOCUMENTS

JP         6-198144        7/1994
JP         2001-29952      2/2001
(Continued)

OTHER PUBLICATIONS

Machine translation of JP 2011101869.*
(Continued)

*Primary Examiner* — Benjamin L Lebron
(74) *Attorney, Agent, or Firm* — Wenderoth, Lind & Ponack, L.L.P.

(57) ABSTRACT

A membrane treatment apparatus (1) comprising: a plurality of flat membrane elements (2) which are immersed in a liquid to be treated, disposed side by side in the first direction so that membrane surfaces face each other; a supporting member (8) for holding the flat membrane element (2) provided at an end part of the flat membrane element on a first side in the second direction; and an aeration means (10) provided below the flat membrane element (2); wherein a lower edge of the flat membrane element (2) is formed to extend upward from the first side to a second side in the second direction, or to extend upward and horizontally from the first side to the second side in the second direction.

13 Claims, 6 Drawing Sheets

(56) References Cited

U.S. PATENT DOCUMENTS

| | | | |
|---|---|---|---|
| 2019/0329182 | A1 | 10/2019 | Narita et al. |
| 2020/0360863 | A1 | 11/2020 | Narita et al. |

FOREIGN PATENT DOCUMENTS

| | | |
|---|---|---|
| JP | 2008-73676 | 4/2008 |
| JP | 2011-101869 | 5/2011 |
| JP | 2011-104502 | 6/2011 |
| JP | 2016-168546 | 9/2016 |
| WO | 2017/208707 | 12/2017 |

OTHER PUBLICATIONS

Machine translation of JP 2008073676.*
Machine translation of JP 2011104502.*
Office Action issued Apr. 30, 2025 in Chinese Patent Application No. 202180070190.2, with English-language Translation.
Office Action issued Jun. 4, 2024 in corresponding Japanese Patent Application No. 2020-173503, with English translation.
International Search Report issued Dec. 14, 2021 in International Application No. PCT/JP2021/037572.
Extended European Search Report issued Oct. 10, 2024 in corresponding European Patent Application No. 21880054.8.
Office Action issued Feb. 6, 2024 in corresponding Japanese Application No. 2020-173503, with English machine translation.

* cited by examiner

[Fig. 1]
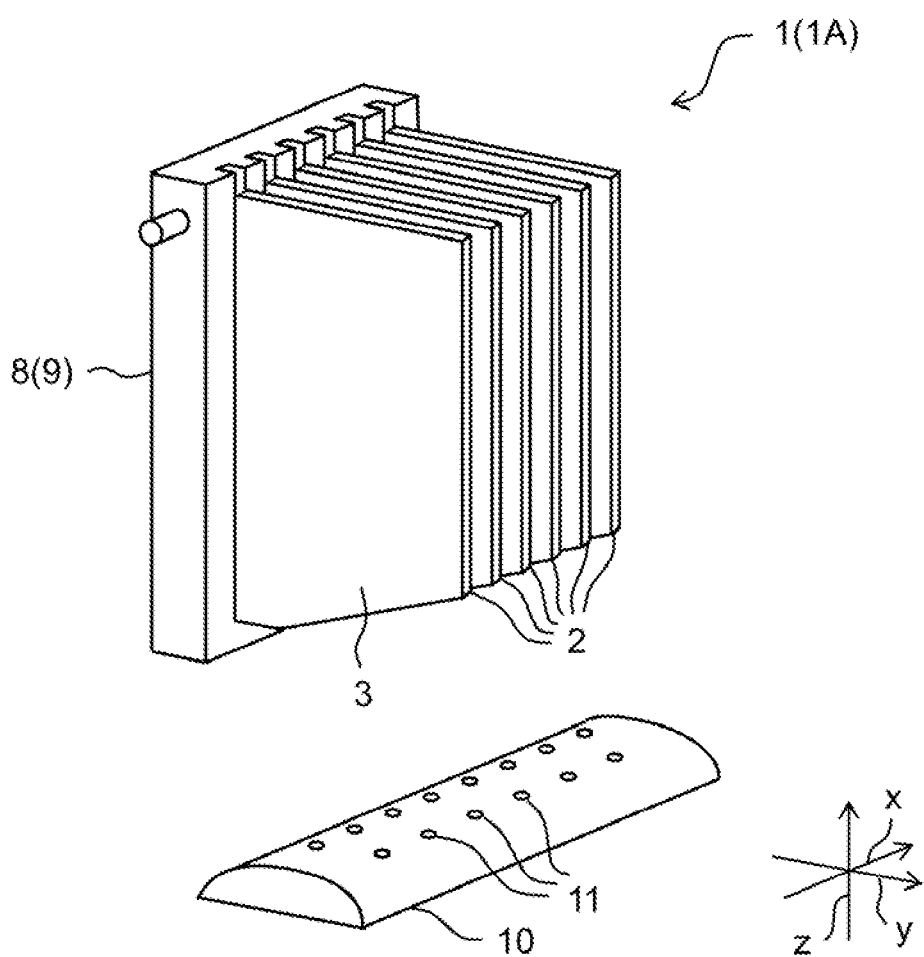

[Fig. 2]
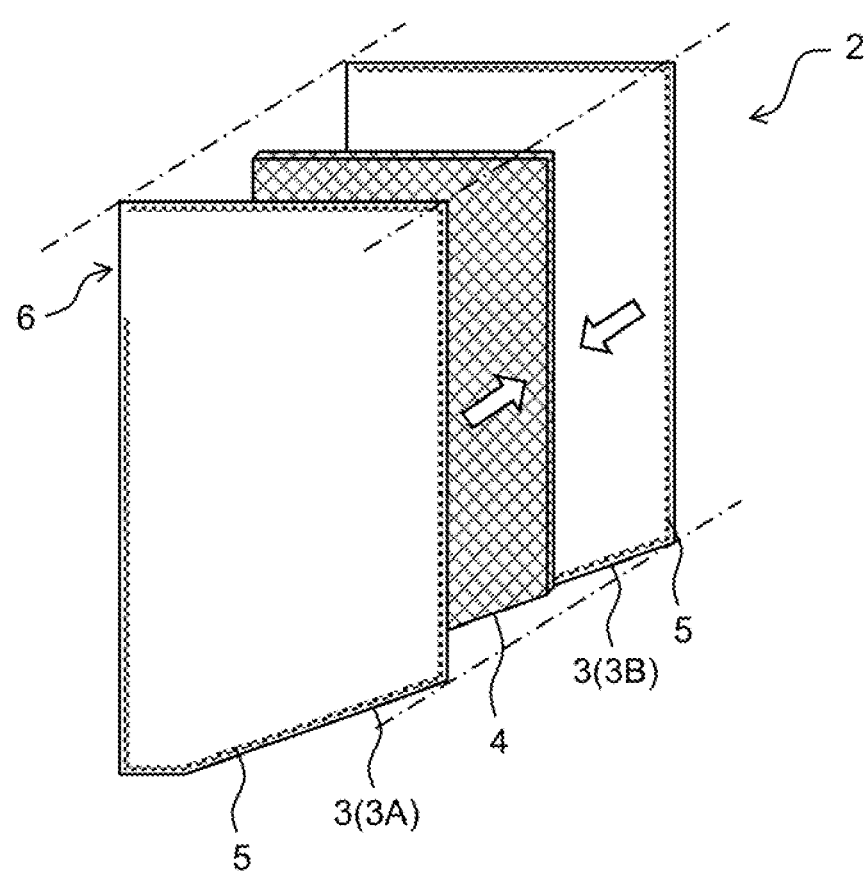

[Fig. 3]
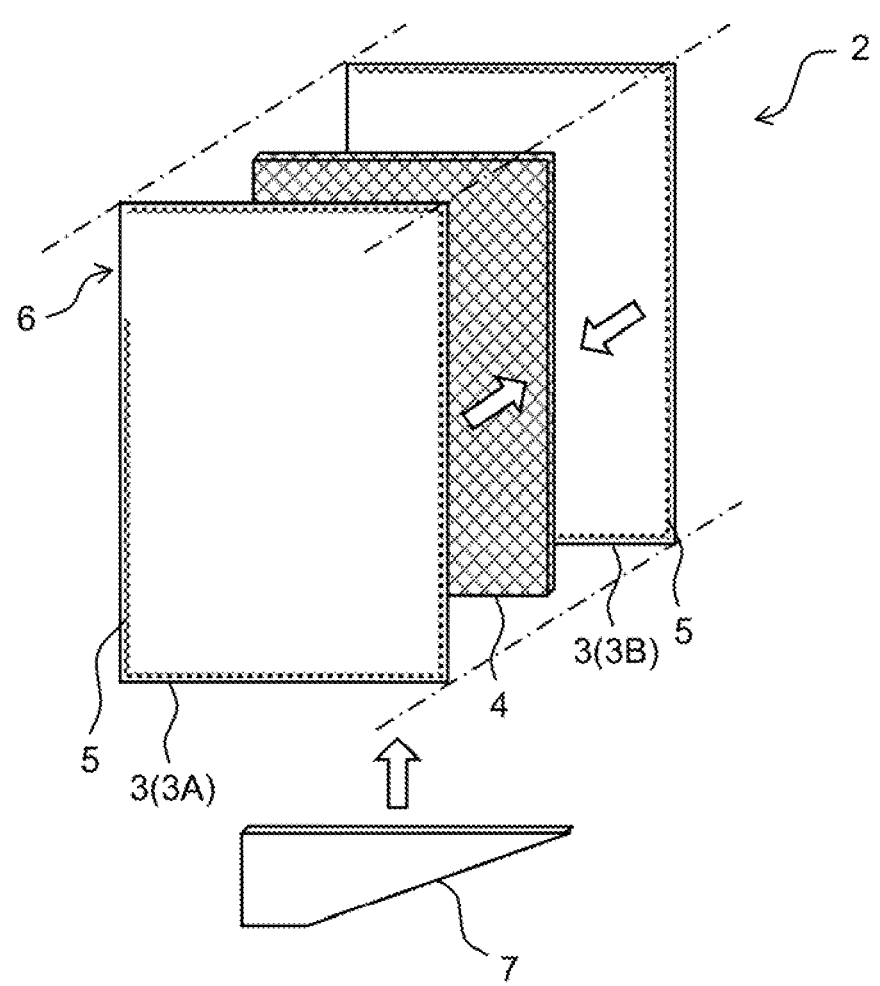

[Fig. 4]
(a)
(b)
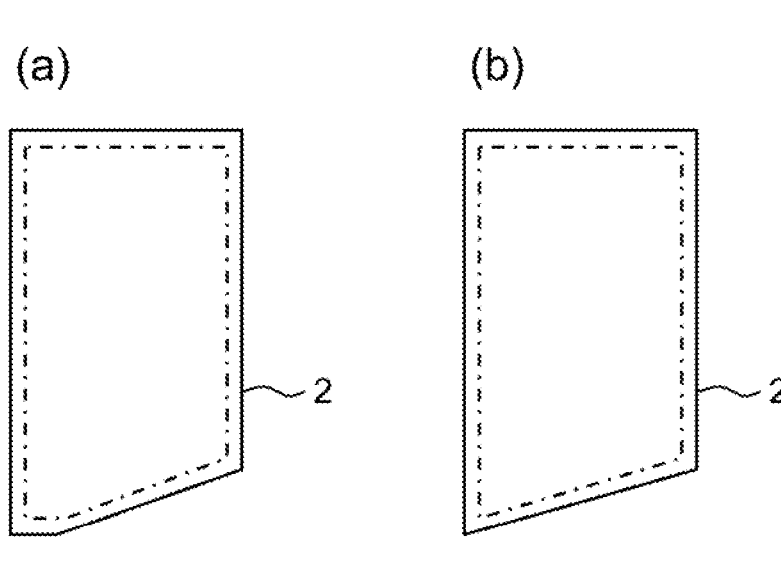
(c)
(d)
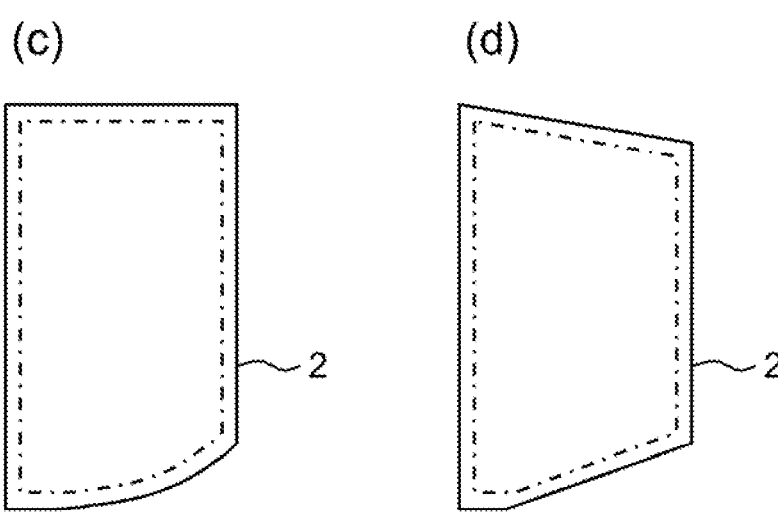

[Fig. 5]
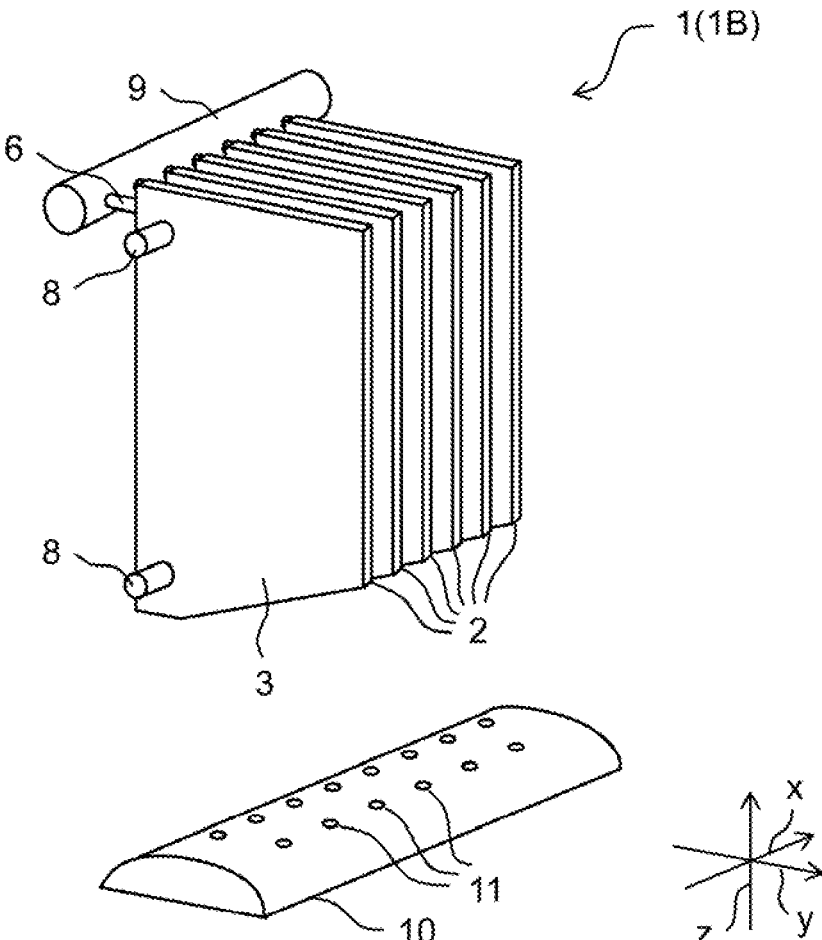

[Fig. 6]
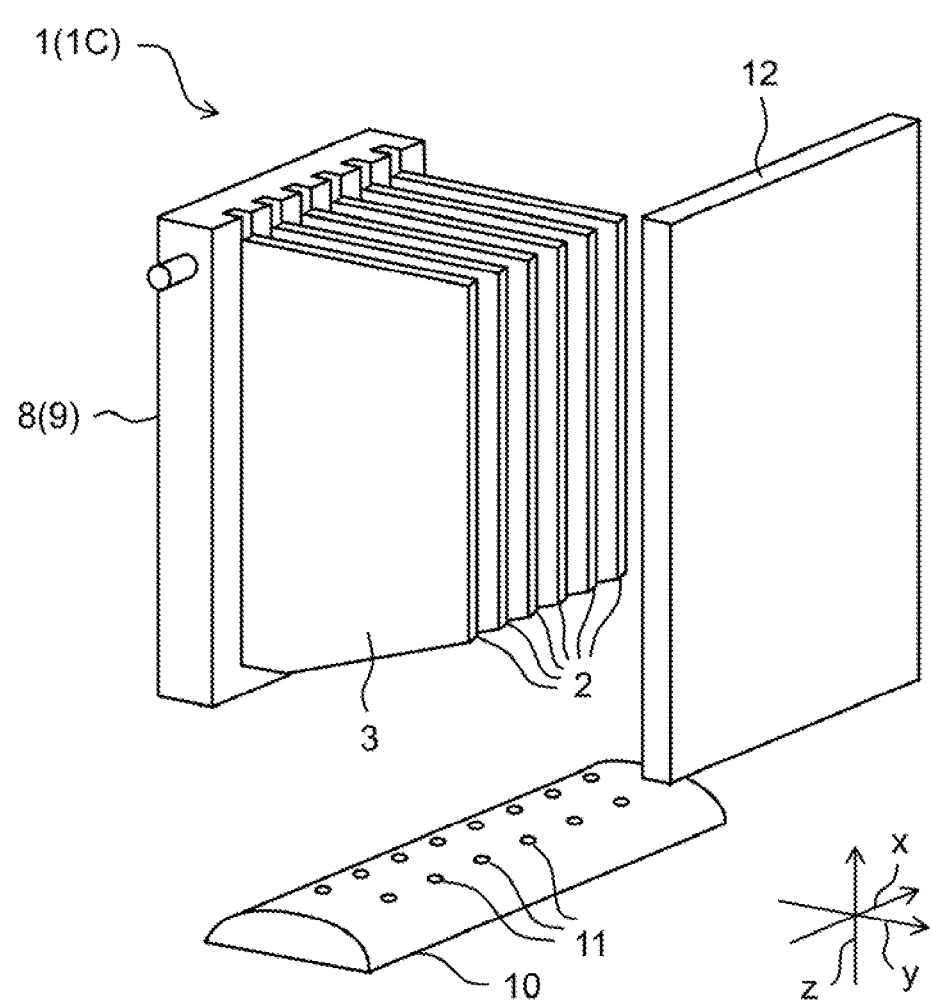

MEMBRANE TREATMENT APPARATUS

TECHNICAL FIELD

The present invention relates to a membrane treatment apparatus comprising a plurality of flat membrane elements immersed in a liquid to be treated.

BACKGROUND ART

Conventionally, a membrane treatment apparatus comprising a plurality of flat membrane elements immersed in a liquid to be treated and an aeration means provided below the flat membrane elements has been known. In such a membrane treatment apparatus, an upward flow of the liquid to be treated is formed in the vicinity of the flat membrane element by supplying gas such as air from the aeration means provided below the flat membrane element. At this time, if the liquid to be treated contains contaminants that easily get entangled, such as fibers and hair, these may be caught on a lower edge of the flat membrane element, whereby there is a possibility that the liquid to be treated may not be smoothly supplied to a surface of the filtration membrane. As a result, the flow of the liquid to be treated on the surface of the filtration membrane is stagnated, and suspended matter accumulates on the surface of the filtration membrane and firmly adheres to it, that makes the filtration membrane prone to clogging. As a membrane treatment apparatus that is designed to prevent contaminants such as fibers and hair from being caught on a lower edge of a flat membrane element, for example, Patent Literature 1 discloses a membrane treatment apparatus in which positions of tips of adjacent flat membrane elements are made different, and Patent Literature 2 discloses a membrane treatment apparatus in which a residue contact suppressing portion is provided at a lower part of a flat membrane element.

CITATION LIST

Patent Literature

Patent Literature 1
  Japanese Unexamined Laid-open Patent Application Publication No. 6-198144
Patent Literature 2
  Japanese Unexamined Laid-open Patent Application Publication No. 2016-168546

SUMMARY OF INVENTION

Technical Problem

In the membrane treatment apparatuses disclosed in Patent Literatures 1 and 2, contaminants such as fibers and hair are less likely to get caught on a lower edge of a flat membrane element, or a filtration membrane is less likely to be damaged even if these contaminants get entangled; however, once contaminants such as fibers and hair are caught on the lower edge of the flat membrane element, these are hardly removed therefrom. Therefore, as process is continued, the lower edge of the flat membrane element may eventually become clogged with contaminants, whereby there is a possibility that the liquid to be treated may not be smoothly supplied to the surface of the filtration membrane. Furthermore, as a result, the flow of the liquid to be treated on the surface of the filtration membrane is stagnated, and suspended matter accumulates on the surface of the filtration membrane and firmly adheres to it, that makes the filtration membrane prone to clogging.

The present invention has been made in view of the above circumstances, and its object is to provide a membrane treatment apparatus in which contaminants such as fibers and hair is easily removed from a lower edge of a flat membrane element even when these contaminants are caught on the lower edge of the flat membrane element.

Solution to Problem

A membrane treatment apparatus of the present invention which solves the above problems has a first direction and a second direction in a horizontal direction and a height direction, and comprises: a plurality of flat membrane elements which are immersed in a liquid to be treated, disposed side by side in the first direction so that membrane surfaces face each other: a supporting member for holding the flat membrane element provided at an end part of the flat membrane element on a first side in the second direction; and an aeration means provided below the flat membrane element; wherein a lower edge of the flat membrane element is formed to extend upward from the first side to a second side in the second direction, or to extend upward and horizontally from the first side to the second side in the second direction, In the membrane treatment apparatus of the present invention, since the lower edge of the flat membrane element is formed to extend upward from the first side to the second side in the second direction, or to extend upward and horizontally from the first side to the second side in the second direction, even when contaminants such as fibers and hairs are caught on the lower edge of the flat membrane element, the contaminants can easily move from the first side to the second side in the second direction along the lower edge of the flat membrane element, while being affected by a flow of gas supplied from the aeration means and the accompanying upward flow of the liquid to be treated. The contaminants that have moved to the second side in the second direction along the lower edge of the flat membrane element can smoothly escape from the second side of the flat membrane element. Therefore, it is less likely to occur that the liquid to be treated is not smoothly supplied to the surface of the filtration membrane due to clogging of the lower edge of the flat membrane element with contaminants, and as a result, the flow of the liquid to be treated on the surface of the filtration membrane is stagnated and suspended matter accumulates on the surface of the filtration membrane to firmly adhere thereto.

It is preferable that the flat membrane element comprises: a first filtration membrane on one side in the first direction; a second filtration membrane on the other side in the first direction; and a flow passage member that is provided between the first filtration membrane and the second filtration membrane and holds a gap between the first filtration membrane and the second filtration membrane, through which a permeated liquid of the first filtration membrane and a permeated liquid of the second filtration membrane flow. In this case, the flat membrane element is preferably configured such that lower edges of the first filtration membrane, the second filtration membrane and the flow passage member are formed to extend upward from the first side to the second side in the second direction, or to extend upward and horizontally from the first side to the second side in the second direction. When the flat membrane element is configured in this manner, a large membrane area for the first filtration membrane and the second filtration membrane can be secured, thereby increasing the filtration amount of the flat membrane element. Meanwhile, the flat membrane element may comprise an auxiliary member at a lower end thereof, and a lower edge of the auxiliary member may be formed to extend upward from the first side to the second side in the second direction, or to extends upward and horizontally from the first side to the second side in the second direction. Even in the case that the flat membrane element is configured in this manner, contaminants such as fibers and hair caught on the lower edge of the flat membrane element easily moves to the second side in the second direction along the lower edge of the flat membrane element.

It is preferable that the flat membrane element has a liquid-impermeable portion on a peripheral part of the membrane surface and a liquid-permeable portion on an inner region of the peripheral part, and an upper edge of the liquid-permeable portion is formed to extend downward from the first side to the second side in the second direction, or to extend downward and horizontally from the first side to the second side in the second direction. When the upper edge of the liquid-permeable portion is formed in this manner, even if gas enters an interior of the flat membrane element, the gas that has entered is easily drawn out from the first side of the flat membrane element in the second direction and gas is less likely to accumulate in the upper part of the liquid-permeable portion, Therefore, a wider part of the filtration membrane can effectively contribute to filtration of the liquid to be treated.

The plurality of flat membrane elements disposed side by side in the first direction are preferably held by a common said supporting member. Thereby, it becomes easy to reduce the size of the membrane treatment apparatus. On the other hand, the plurality of the flat membrane elements disposed side by side in the first direction may be each held by a separate said supporting member.

It is preferable that the flat membrane element has an outlet part from which a permeated liquid that has passed through a filtration membrane is taken out, and a collection part is provided in communication with the outlet part Thereby, the permeated liquid that has passed through the filtration membrane is collected to the collection part and the permeated liquid can be collectively taken out from the membrane treatment apparatus. The supporting member may also serve as the collection part, and thereby, the size of the membrane treatment apparatus can be reduced.

It is preferable that at least one of the plurality of flat membrane elements disposed side by side in the first direction has a lower edge which is higher than the adjacent flat membrane element. When the lower edge of the flat membrane element is formed in this manner, the degree of freedom that contaminants can move in the first direction increases, and contaminants are less likely to be strongly restricted to the lower edge of the flat membrane element. Therefore, contaminants caught on the lower edge of the flat membrane element are affected by the flow of gas supplied from the aeration means and the accompanying upward flow of the liquid to be treated, thereby easily moving along the lower edge of the flat membrane element from the first side to the second side in the second direction.

The membrane treatment apparatus may comprise a vertically extending partition member provided so as to face an edge of the flat membrane element on the second side in the second direction. When the partition member is provided in this manner, an upward flow of the liquid to be treated is easily formed between the flat membrane element and the partition member by the flow of gas supplied from the aeration means. Therefore, after contaminants that have moved along the lower edge of the flat membrane element to the second side in the second direction escape from the lower edge of the flat membrane element, they can easily move upward along the partition member.

It is preferable that the aeration means is set so that the amount of air diffusion is greater on the first side than on the second side in the second direction. This makes it easier for contaminants caught on the lower edge of the flat membrane element easily to move from the first side to the second side in the second direction by the flow of gas supplied from the aeration means.

Advantageous Effects of Invention

In the membrane treatment apparatus of the present invention, even when contaminants such as fibers and hair are caught on the lower edge of the flat membrane element, the contaminants easily move along the lower edge of the flat membrane element from the first side to the second side in the second direction, and the contaminants can be smoothly removed from the second side of the flat membrane element in the second direction. Therefore, it is less likely to occur that the liquid to be treated is not smoothly supplied to the surface of the filtration membrane due to clogging of the lower edge of the flat membrane element with contaminants, and as a result, a flow of the liquid to be treated on the surface of the filtration membrane is stagnated and suspended matter accumulates on the surface of the filtration membrane to firmly adhere thereto.

BRIEF DESCRIPTION OF THE DRAWINGS

FIG. 1 shows a configuration example of a membrane treatment apparatus of the present invention, and represents a perspective view of the membrane treatment apparatus.

FIG. 2 shows an example of an exploded perspective view of a flat membrane element of the membrane treatment apparatus shown in FIG. 1.

FIG. 3 shows another example of an exploded perspective view of a flat membrane element of the membrane treatment apparatus shown in FIG. 1.

FIG. 4 shows various examples of planar shapes of flat membrane elements.

FIG. 5 shows another configuration example of the membrane treatment apparatus of the present invention, and represents a perspective view of the membrane treatment apparatus.

FIG. 6 shows another configuration example of the membrane treatment apparatus of the present invention, and represents a perspective view of the membrane treatment apparatus.

DESCRIPTION OF THE PREFERRED EMBODIMENTS

A membrane treatment apparatus of the present invention comprises a plurality of flat membrane elements immersed in a liquid to be treated and an aeration means provided below the flat membrane elements. The flat membrane element comprises a filtration membrane, and a permeated liquid is obtained by filtering the liquid to be treated through the filtration membrane. In the membrane treatment apparatus of the present invention, an upward flow of the liquid to be treated is formed in the vicinity of the flat membrane element by supplying gas such as air from the aeration means provided below the flat membrane element; and at this time, when the liquid to be treated contains contaminants that easily get entangled, such as fibers and hair, these may be caught on a lower edge of the flat membrane element, whereby there is a possibility that the liquid to be treated may not be smoothly supplied to a surface of the filtration membrane. As a result, the flow of the liquid to be treated on the surface of the filtration membrane is stagnated, and suspended matter accumulates on the surface of the filtration membrane and firmly adheres to it, that makes the filtration membrane prone to clogging. In the membrane treatment apparatus of the present invention, even when the liquid to be treated contains contaminants that easily get entangled, such as fibers and hair, continuous filtration of the liquid to be treated by the flat membrane element is facilitated. The membrane treatment apparatus of the present invention is described in detail below.

The membrane treatment apparatus comprises a plurality of flat membrane elements which are immersed in a liquid to be treated. The flat membrane element is installed, for example, in a water tank, and the flat membrane element is immersed in the liquid to be treated in the state that the liquid to be treated is stored in the water tank.

The kind of the liquid to be treated is not particularly limited; however, since the liquid to be treated is filtered by the flat membrane element, it is preferable that the liquid to be treated contains solids such as contaminants and suspended matter. Examples of the liquid to be treated include sewage, night soil, process wastewater generated by treatment of sewage or night soil, industrial wastewater generated from food factories, paper pulp factories, chemical factories and the like, livestock manure, wastewater generated by treatment of livestock waste such as livestock manure, kitchen wastewater, activated sludge used in these treatments, and others.

The flat membrane element is formed in a flat plate shape, and a filtration membrane is provided on a main surface of the flat membrane element. The flat membrane element has a liquid to be treated side on which the liquid to be treated exists and a permeated liquid side on which a permeated liquid exists across the filtration membrane. The liquid to be treated side is an outer side (outer surface) of the flat membrane element, and the permeated liquid side is an inner side (inside) of the flat membrane element. As the filtration membrane, any filtration membrane capable of capturing contaminants and suspended matter contained in the liquid to be treated and obtaining a permeated liquid can be used, and examples thereof include, for example, a microfiltration (MF) membrane and an ultrafiltration (UF) membrane. The filtration membrane may be coarser than the microfiltration membrane. Materials constituting the filtration membrane are not particularly limited, and examples thereof include resins, ceramics, and metals. The filtration membrane is preferably made of resin since it is easy to obtain a thin and lightweight flat membrane element.

The flat membrane element preferably has an outlet part from which the permeated liquid that has passed through the filtration membrane is taken out. The outlet part is provided on the permeated liquid side of the flat membrane element, and the permeated liquid can be taken out from the inside of the flat membrane element through the outlet part. The outlet part can be provided on an end face of the flat membrane element or on a membrane surface of the flat membrane element. The end face of the flat membrane element means a lateral face part surrounding the membrane surface of the flat membrane element, and does not necessarily have to be formed planarly.

The permeated liquid taken out from the inside of the flat membrane element through the outlet part is preferably collected in a collection part. As a result, the permeated liquid can be collectively taken out from the membrane treatment apparatus. The collection part is provided in communication with the outlet part.

Filtration by the filtration membrane is performed by utilizing a differential pressure between the liquid to be treated side and the permeated liquid side of the filtration membrane. Filtration may be performed by pressurizing the liquid to be treated side of the filtration membrane, by decompressing the permeated liquid side of the filtration membrane, or by combining both. In the membrane treatment apparatus, since the flat membrane element is immersed in the liquid to be treated, the liquid to be treated side of the filtration membrane is somewhat pressurized by water pressure based on water depth of which the filtration membrane is installed, From the viewpoint of efficient filtration, the filtration is preferably performed by decompressing the permeated liquid side of the filtration membrane using a suction pump or the like. Therefore, it is preferable that the membrane treatment apparatus is provided with decompressing means such as a suction pump, which is communicated with the outlet part of the flat membrane element or the collection part.

It is preferable that the flat membrane element comprises a first filtration membrane and a second filtration membrane. The first filtration membrane and the second filtration membrane are provided on the main surfaces of the flat membrane element so that their membrane surfaces face each other, and a portion between the first filtration membrane and the second filtration membrane corresponds to the permeate side of the flat membrane element. It is also preferable that the flat membrane element comprises a flow passage member between the first filtration membrane and the second filtration membrane. The flow passage member functions as a spacer that holds a gap between the first filtration membrane and the second filtration membrane, and forms a space through which the permeated liquid of the first filtration membrane and the permeated liquid of the second filtration membrane flow between the first filtration membrane and the second filtration membrane. As the flow passage member, a frame, a plate having grooves on its surface, a woven fabric, a knitted fabric, a nonwoven fabric, a net-like body, or the like can be employed. In a woven fabric, a knitted fabric, a nonwoven fabric, and a net-like body, internal space can function as flow passages for the permeated liquid. The first filtration membrane and the second filtration membrane are preferably joined to the flow passage member by a known joining means such as an adhesive or welding.

It is preferable that the flat membrane element has a liquid-impermeable portion on a peripheral part of the membrane surface and a liquid-permeable portion on an inner region of the peripheral part. The liquid-impermeable portion can be formed by, for example, sealing the first filtration membrane and the second filtration membrane each other at the peripheral part of each membrane surface, or sealing the first filtration membrane and the second filtration membrane to the flow passage member at the peripheral part of each membrane surface. A joint part between the first filtration membrane and the second filtration membrane or a joint part between the first or second filtration membrane and the flow passage member is formed so that the liquid to be treated does not pass through the filtration membrane. On the other hand, the liquid-permeable portion is defined as a portion of which the liquid to be treated can pass through the filtration membrane. The peripheral part of the membrane surface can be defined, for example, as a region within 50 mm (preferably within 30 mm, more preferably within 20 mm) from a periphery of the filtration membrane.

Thickness of the flat membrane element is not particularly limited, and it is preferably 15 mm or thinner, more preferably 10 mm or thinner, and even more preferably 7 mm or thinner, from the viewpoint of miniaturization of the membrane treatment apparatus. The size of the flat membrane element in a membrane surface direction (namely a horizontal direction and a height direction) may be appropriately set, for example, between 30 cm×30 cm and 200 cm×200 cm.

The membrane treatment apparatus has a first direction and a second direction in a horizontal direction and a height direction, and the plurality of flat membrane elements are disposed side by side in the first direction so that their membrane surfaces face each other. The first direction and the second direction are horizontally oriented and preferably defined to be substantially perpendicular to each other. The flat membrane element is preferably installed so that the membrane surface is substantially perpendicular to the horizontal direction, and therefore, the flat membrane element is preferably installed such that the membrane surface extends substantially in the second direction and the height direction.

The number of the flat membrane elements disposed side by side in the first direction is not particularly limited as long as it is 2 or more, and preferable 3 or more, more preferable 5 or more. The upper limit of the number of the flat membrane elements disposed side by side in the first direction may be appropriately set according to the size of the water tank in which the membrane treatment apparatus is installed, the amount of the liquid to be treated and quality of the water, and it may be, for example, 50 or less, 30 or less, or 20 or less.

Distance between the membrane surfaces of the flat membrane elements adjacent to each other in the first direction is preferably 1 mm or larger, more preferably 3 mm or larger, and even more preferably 5 mm or larger. Thereby, contaminants are less likely to be caught between the adjacent flat membrane elements, and a flow of the liquid to be treated on the surface of the filtration membrane is easily ensured. Meanwhile, the upper limit of the distance between the membrane surfaces of the flat membrane elements adjacent to each other in the first direction is preferably 80 mm or smaller, more preferably 60 mm or smaller, and even more preferably 40 mm or smaller, from the viewpoint of miniaturization of the membrane treatment apparatus.

A supporting member for holding the flat membrane element is provided at an end part of the flat membrane element on one side (first side) in the second direction. The supporting member fixes the end part of the flat membrane element on the first side in the second direction in place in the membrane treatment apparatus. The supporting member is provided only at the end part of the flat membrane element on the first side in the second direction, and is not provided at an end part of that on the other side (second side) in the second direction. Therefore, the flat membrane element is cantilevered by the supporting member. The end part of the flat membrane element on the second side in the second direction is in an unconstrained state in which it can move freely to some extent.

The supporting member may be provided so as to hold the entirety, with respect to the height direction, of the end part of the flat membrane element on the first side in the second direction, or may be provided so as to hold only a part, with respect to the height direction, of that. From the viewpoint of stably holding the flat membrane element, it is preferable that the supporting member is provided so as to hold at least a part of an upper ⅓ region and at least a part of a lower ⅓ region of the end part of the flat membrane element on the first side in the second direction.

The supporting member can be formed, for example, to have a groove extending in the height direction. By fitting the end part of the flat membrane element on the first side in the second direction into the groove formed in the supporting member, the flat membrane element can be held by the supporting member. The supporting member can also be provided as a rod-shaped member penetrating the plurality of flat membrane elements disposed side by side in the first direction. On the first side of the flat membrane element in the second direction, only one supporting member may be provided or two or more supporting members may be provided side by side in the height direction.

The plurality of flat membrane elements disposed side by side in the first direction may be held by a common supporting member, or may be each held by a separate supporting member. In the former case, the supporting member has a certain length in the first direction, and one supporting member holds a plurality of flat membrane elements. In the membrane treatment apparatus, the one supporting member and the plurality of flat membrane elements held thereby can be handled as one unit, which improves handleability of the membrane treatment apparatus. In addition, it becomes easy to reduce the size of the membrane treatment apparatus. In the latter case, one supporting member holds one flat membrane element, and in the membrane treatment apparatus, one supporting member and one flat membrane element held thereby can be handled as one unit.

The flat membrane elements may be disposed side by side in the second direction such that the membrane surfaces do not face each other. In this case, a plurality of flat membrane elements are disposed side by side in the first direction so that their membrane surfaces face each other, as well as a plurality of flat membrane elements are disposed side by side in the second direction so that their membrane surfaces do not face each other. The flat membrane elements disposed side by side in the second direction are preferably disposed so that their membrane surfaces are substantially coplanar. The flat membrane elements disposed side by side in the second direction in this manner may be held by a common supporting member. In this case, the supporting member is provided between the flat membrane elements disposed side by side in the second direction, and the flat membrane elements disposed side by side in the second direction are held by this supporting member.

The supporting member may also serve as the collection part. In this case, the supporting member has a hollow space inside, and this hollow space can function as the collection part. In the flat membrane element, by connecting the outlet part of the permeated liquid to the collection part, the permeated liquid can be collected from the inside of the flat membrane element to the collection part.

The aeration means is provided below the flat membrane element. Gas such as air can be supplied to the liquid to be treated from below the flat membrane element by the aeration means. In the case where the liquid to be treated is activated sludge, the aeration means can supply oxygen to the activated sludge, thereby promoting biodegradation of organic matter contained in the liquid to be treated. As the aeration means, an aerator generally used for water treatment can be used. Examples of the aerator include a membrane-type aerator, a diffuser-type aerator, a porous-type aerator and others. An underwater mechanical stirrer, of which air or the like is subdivided by stirring blades and supplied to the liquid to be treated, may also be used.

When gas is supplied from below the flat membrane element by the aeration means, an upward flow of the liquid to be treated is formed in the vicinity of the flat membrane element. At this time, when the liquid to be treated contains contaminants that easily get entangled, such as fibers and hair, these may get caught on a lower edge of the flat membrane element, whereby there is a possibility that the liquid to be treated may not be smoothly supplied to the surface of the filtration membrane. As a result, the flow of the liquid to be treated on the surface of the filtration membrane is stagnated, and suspended matter accumulates on the surface of the filtration membrane and firmly adheres to it, that makes the filtration membrane prone to clogging.

Therefore, in the membrane treatment apparatus of the present invention, the lower edge of the flat membrane element is formed so as to extend upward from the first side to the second side in the second direction, or to extend upward and horizontally from the first side to the second side in the second direction. That is, the lower edge of the flat membrane element is formed so as to be positioned upward as a distance from the first side in the second direction where the supporting member is provided increases. A part of the lower edge of the flat membrane element may be a horizontal part. As the flat membrane element is formed in this manner, even when contaminants such as fibers and hairs get caught on the lower edge of the flat membrane element, the contaminants can easily move from the first side to the second side in the second direction along the lower edge of the flat membrane element, while being affected by the flow of gas supplied from the aeration means and the accompanying upward flow of the liquid to be treated. Since the end part of the flat membrane element on the second side in the second direction is not held by the supporting member, the contaminants that have moved to the second side in the second direction can smoothly escape from the lower edge of the flat membrane element without being obstructed by the supporting member. Therefore, it is less likely to occur that the liquid to be treated is not smoothly supplied to the surface of the filtration membrane due to clogging of the lower edge of the flat membrane element with contaminants, and as a result, the flow of the liquid to be treated on the surface of the filtration membrane is stagnated and suspended matter accumulates on the surface of the filtration membrane to firmly adhere thereto.

In the membrane treatment apparatus of the present invention, since the end part of the flat membrane element on the second side in the second direction is not held by the supporting member, the end part of the flat membrane element on the second side in the second direction can move freely to some extent. Therefore, even when contaminants enter between the adjacent flat membrane elements, the contaminants can easily escape from between the adjacent flat membrane elements due to fluctuation in an inter-membrane distance between the adjacent flat membrane elements. In particular, by introducing gas supplied from the aeration means between adjacent flat membrane elements, the flat membrane elements are fluttered, and the inter-membrane distance between the adjacent flat membrane elements tends to fluctuate.

Since the membrane treatment apparatus of the present invention has a single-supported structure of which the end part of the flat membrane element on the first side in the second direction is held by the supporting member and the end part of that on the second side in the second direction is not held by the supporting member, the effect of the flat membrane element being not fixed in a deformed state in the first direction can also be obtained. For example, in the case where the flat membrane element has a double-supported structure of which both ends thereof in the second direction are held by supporting members, when the flat membrane element deforms by swelling or the like, the flat membrane element has no choice to deform in the first direction and its deformed state is fixed. As a result, a portion where the inter-membrane distance between the adjacent flat membrane elements becomes narrow is generated, and contaminants easily clog between the flat membrane elements. However, in the membrane treatment apparatus of the present invention, since the flat membrane element has a single-supported structure, the flat membrane element can be deformed in the second direction when the flat membrane element deforms by swelling or the like, and even if the flat membrane element deforms in the first direction, its deformed state is not fixed, and partially narrowing of the inter-membrane distance between the adjacent flat membrane elements is not fixed. Therefore, it is possible to set the inter-membrane distance between the adjacent flat membrane elements narrow in advance, and to reduce the size of the membrane treatment apparatus.

The lower edge of the flat membrane element is formed to have an inclined part extending upward from the first side to the second side in the second direction, and the lower edge may further have a horizontal part extending in the horizontal direction. The inclined part of the lower edge of the flat membrane element may be inclined linearly or curvedly. The inclined part of the lower edge of the flat membrane element is preferably formed in a range of 50% or more, more preferably 60% or more, even more preferably 70% or more of length of the flat membrane element in the second direction. The entire lower edge of the flat membrane element may be formed of the inclined part.

The lower edge of the flat membrane element is preferably formed to extend upward from the first side to the second side in the second direction in the following manner. That is, provided that the length of the lower edge of the flat membrane element in the second direction is L1 and the length of the lower edge of the flat membrane element in the height direction from a lower end to an upper end thereof is L2, L2/L1 is preferably 0.1 or more, more preferably 0.3 or more, even more preferably 0.5 or more, and preferably 1.2 or less, more preferably 1.0 or less, even more preferably 0.8 or less. By forming the lower edge of the flat membrane element in this manner, contaminants caught on the lower edge of the flat membrane element easily move from the first side to the second side in the second direction along the lower edge of the flat membrane element, and it becomes easy to secure a large membrane area for the filtration membrane.

From the viewpoint of securing a large membrane area for the flat membrane element, it is preferable that the first filtration membrane and the second filtration membrane extend to the vicinity of the lower edge of the flat membrane element, ln this case, the flat membrane element comes to be configured so that the lower edges of the first filtration membrane, the second filtration membrane and the flow passage member are formed to extend upward from the first side to the second side in the second direction, or extend upward and horizontally from the first side to the second side in the second direction. The first filtration membrane and the second filtration membrane preferably extend up to, for example, within 50 mm, more preferably within 30 mm, and even more preferably within 20 mm from the lower edge of the flat membrane element. The first filtration membrane and the second filtration membrane may extend up to the lower edge of the flat membrane element. The flat membrane element is also preferably configured such that a lower edge of the liquid-permeable portion extends upward from the first side to the second side in the second direction, or extends upward and horizontally from the first side to the second side in the second direction.

The flat membrane element may comprise an auxiliary member at the lower end thereof, and a lower edge of the auxiliary member may be formed to extend upward from the first side to the second side in the second direction, or extends upward and horizontally from the first side to the second side in the second direction. In this case, the auxiliary member is attached below the first filtration membrane, the second filtration membrane, and the flow passage member. For example, existing flat membrane elements are formed in a rectangular shape with a lower edge extending horizontally; and by attaching the auxiliary member, whose lower edge is formed to extend upward from the first side to the second side in the second direction, or extends upward and horizontally from the first side to the second side in the second direction, to the existing flat membrane element, the flat membrane element can be formed so that contaminants such as fibers and hair are less likely to be caught on the lower edge thereof.

The shape of an upper edge of the flat membrane element is not particularly limited. However, the flat membrane element is preferably configured so that an upper edge of the liquid-permeable portion is formed to extend horizontally or downward from the first side to the second side in the second direction. When the upper edge of the liquid-permeable portion is formed in this manner, even when gas enters the interior of the flat membrane element, the gas is less likely to accumulate in an upper part of the flat membrane element on the second side in the second direction, and therefore, a wider area of the filtration membrane can effectively contribute to filtration of the liquid to be treated. More preferably, the flat membrane element is configured so that the upper edge of the liquid-permeable portion is formed to extend downward from the first side to the second side in the second direction, or extends downward and horizontally from the first side to the second side in the second direction. This makes it easier for the gas that has entered the interior of the flat membrane element to be drawn out from the first side of the flat membrane element in the second direction, whereby gas is less likely to accumulate in the upper part of the liquid-permeable portion.

The plurality of flat membrane elements disposed side by side in the first direction may have the same height of the lower edge, or may have different heights in part or all. When at least one of the plurality of flat membrane elements disposed side by side in the first direction has a lower edge higher than the adjacent flat membrane element, contaminants are less likely to be caught on the lower edge of the flat membrane element, which is preferable. In this case, heights of the lower edges of the plurality of flat membrane elements disposed side by side in the first direction are formed unevenly, so that the degree of freedom that contaminants can move in the first direction increases, and contaminants are less likely to be strongly restricted to the lower edge of the flat membrane element. Therefore, contaminants caught on the lower edge of the flat membrane element are affected by the flow of gas supplied from the aeration means and the accompanying upward flow of the liquid to be treated, thereby easily moving along the lower edge of the flat membrane element from the first side to the second side in the second direction.

The lower edges of the plurality of flat membrane elements disposed side by side in the first direction may be formed, for example, so as to be high every other, every two, or every three, the heights of two flat membrane elements may be formed high continuously, or the heights of three flat membrane elements may be formed high continuously, and these are not particularly limited. The heights of the lower edges of the flat membrane elements disposed side by side in the first direction may be two different, three different, or more.

The lower edges of the plurality of flat membrane elements disposed side by side in the first direction are preferably formed such that, for example, at least one flat membrane element except of the flat membrane elements located on the most first side and the most second side in the first direction among the plurality of flat membrane elements disposed side by side in the first direction has a lower edge higher than the adjacent flat membrane element. When the flat membrane element is configured in this manner, a wide gap is formed at a portion where the lower edge of the flat membrane element is positioned high, and contaminants are less likely to be caught on the lower edge of the flat membrane element.

It is also preferable that the plurality of flat membrane elements disposed side by side in the first direction are formed such that the heights of the lower edges of the adjacent flat membrane elements are different. When the flat membrane elements are configured in this manner, a gap between the membranes is formed widened over the entire lower side of the plurality of flat membrane elements disposed side by side in the first direction, and contaminants are less likely to be caught on the lower edge of the flat membrane elements.

It is preferable that the aeration means installed below the flat membrane element is set so that the amount of air diffusion is greater on the first side than on the second side in the second direction. Thereby, contaminants caught on the lower edge of the flat membrane element easily move from the first side to the second side in the second direction by the gas flow supplied from the aeration means. Examples of the embodiment in which the aeration means is set so that the amount of air diffusion is greater on the first side than on the second side in the second direction include: an embodiment in which a large number of aerators are installed below the flat membrane element on the first side than on the second side in the second direction: an embodiment in which an aerator installed below the flat membrane element is provided with a larger number or denser air diffusion ports on the first side than on the second side in the second direction; and an embodiment in which the amount of gas supplied to an aerator provided on the first side in the second direction is made greater than the amount of gas supplied to an aerator provided on the second side in the second direction of the aerators installed below the flat membrane elements.

The membrane treatment apparatus may be provided with a vertically extending partition member that is provided so as to face an edge of the flat membrane element on the second side in the second direction. In this case, the partition member is provided on the extension of the flat membrane element in the second direction. When the partition member is provided in this manner, the upward flow of the liquid to be treated is easily formed between the flat membrane element and the partition member by the flow of gas supplied from the aeration means. Therefore, after contaminants that have moved along the lower edge of the flat membrane element to the second side in the second direction escape from the lower edge of the flat membrane element, they can smoothly move upward along the partition member. The partition member is preferably provided at a distance of 100 cm shorter, more preferably 80 cm or shorter, even more preferably 50 cm or shorter from the edge of the flat membrane element on the second side in the second direction. Meanwhile, the partition member is preferably provided at a distance of 5 cm or longer, more preferably 10 cm or longer from the edge of the flat membrane element on the second side in the second direction, from the viewpoint of allowing contaminants to smoothly move upward between the flat membrane element and the partition member.

Regarding the partition member, at least a part of an upper edge of the partition member is preferably positioned below a water surface of the liquid to be treated, and at least a part of a lower edge of the partition member is preferably positioned above a bottom of the water tank. In addition, it is preferable that the liquid to be treated exists on the second side of the partition member in the second direction. By providing the partition member in this manner, an upward flow is formed on the first side of the partition member in the second direction and a downward flow is formed on the second side of the partition member, whereby a circulating flow can be formed across the partition member.

Next, configuration examples of the membrane treatment apparatus of the present invention are described with reference to the drawings. However, the membrane treatment apparatus of the present invention is not limited to the embodiments shown in the drawings.

FIGS. 1 and 2 show configuration examples of the membrane treatment apparatus of the present invention. FIG. 1 represents a perspective view of a membrane treatment apparatus, and FIG. 2 represents an example of an exploded perspective view of a flat membrane element of the membrane treatment apparatus shown in FIG. 1. In the drawings, arrow x represents a first direction in a horizontal direction, arrow y represents a second direction in the horizontal direction, and arrow z represents a height direction.

A membrane treatment apparatus 1(1A) comprises a plurality of flat membrane elements 2. The flat membrane elements 2 are immersed in a liquid to be treated and disposed side by side in a first direction x so that membrane surfaces face each other. A supporting member 8 for holding the flat membrane element 2 is provided at an end part of the flat membrane element 2 on one side (first side) in a second direction y, and an end part of the flat membrane element 2 on the other side (second side) in the second direction y exists as a free end. In the membrane treatment apparatus 1A shown in FIG. 1, the plurality of flat membrane elements 2 disposed side by side in the first direction x are held by one supporting member 8. In the supporting member 8, a plurality of grooves extending in a height direction z are formed, and the flat membrane element 2 is inserted and held in each groove.

As shown in FIG. 2, the flat membrane element 2 is configured that a flow passage member 4 is provided between a first filtration membrane 3A and a second filtration membrane 3B. The flow passage member 4 functions as a spacer that holds a gap between the first filtration membrane 3A and the second filtration membrane 3B, and functions as a flow path through which permeated liquids that has passed through the first filtration membrane 3A and the second filtration membrane 3B flow. In FIG. 2, the first filtration membrane 3A and the second filtration membrane 3B are formed to have one size larger than the flow passage member 4, and the first filtration membrane 3A and the second filtration membrane 3B are joined to each other at a joint part 5 of their peripheral part. The joint part 5 between the first filtration membrane 3A and the second filtration membrane 3B is a liquid-impermeable portion, and an inner region of the peripheral part is a liquid-permeable portion. A part of the peripheral part of the first filtration membrane 3A and the second filtration membrane 36 is formed such that the first filtration membrane 3A and the second filtration membrane 3B are not joined to each other to form an outlet part 6 from which the permeated liquids that have passed through the first filtration membrane 3A and the second filtration membrane 38 are taken out.

In FIG. 1, a hollow portion is formed inside the supporting member 8, and this hollow portion functions as a collection part 9. The outlet part 6 of the flat membrane element 2 is attached to the supporting member 8 so as to communicate with the collection part 9 that is inside the supporting member 8. The permeated liquid that has passed through the filtration membrane 3 of each flat membrane element 2 is collected in the collection part 9 through the outlet part 6. The collection part 9 is depressurized by a decompression pump, thereby promoting permeation of the liquid to be treated through the filtration membrane 3, and the permeated liquid that has passed through the filtration membrane 3 is collected in the collection part 9 through the outlet part 6.

An aeration means 10 is provided below the flat membrane element 2. Gas such as air is supplied from a diffusion port 11 of the aeration means 10 into the liquid to be treated, An upward flow of the liquid to be treated is formed in the vicinity of the flat membrane element 2 by supplying the gas from the aeration means 10 into the liquid to be treated.

A lower edge of the flat membrane element 2 is formed to extend upward and horizontally from the first side to the second side in the second direction y. By forming the flat membrane element 2 in this manner, even when contaminants such as fibers and hair are caught on the lower edge of the flat membrane element 2, the contaminants can easily move from the first side to the second side in the second direction y along the lower edge of the flat membrane element 2, while being affected by a flow of gas supplied from the aeration means 10 and the accompanying the upward flow of the liquid to be treated. The contaminants that have moved to the second side in the second direction y along the lower edge of the flat membrane element 2 can smoothly escape from the second side of the flat membrane element 2 in the second direction y. Although not shown in the drawings, the entire lower edge of the flat membrane element 2 may be formed to extend upward from the first side to the second side in the second direction y.

The flat membrane element 2 is preferably configured such that lower edges of the first filtration membrane 3A, the second filtration membrane 3 and the flow passage member 4 are formed to extend upward from the first side to the second side in the second direction y, or extend upward and horizontally from the first side to the second side in the second direction y, as shown in FIG. 2. When the flat membrane element 2 is configured in this manner, a large membrane area for the first filtration membrane 3A and the second filtration membrane 3B can be secured, and the filtration amount of the flat membrane element 2 can be increased.

FIG. 3 shows another example of an exploded perspective view of the flat membrane element of the membrane treatment apparatus shown in FIG. 1, and the flat membrane element 2 may comprise an auxiliary member 7 at its lower end and the lower edge of the auxiliary member 7 may be formed to extend upward and horizontally from the first side to the second side in the second direction y. Or, although not shown in the drawings, the entire lower edge of the auxiliary member 7 may be formed to extend upward from the first side to the second side in the second direction y. Even when the flat membrane element 2 is configured in this manner, contaminants such as fibers and hair caught on the lower edge of the flat membrane element 2 easily moves to the second side in the second direction y along the lower edge of the flat membrane element 2.

FIG. 4 shows various examples of planar shapes of the flat membrane element. In FIG. 4, a left side of the drawing corresponds to the first side in the second direction y, and a right side of the drawing corresponds to the second side in the second direction y. The liquid-permeable portion of a membrane surface of the flat membrane element is represented to be surrounded by a dashed line.

FIG. 4(a) shows a plan view of the flat membrane element 2 provided in the membrane treatment apparatus 1A of FIG. 1, and the lower edge of the flat membrane element 2 is composed of an inclined part and a horizontal part. The lower edge of the flat membrane element 2 of FIG. 4(a) is formed to extend upward and horizontally from the first side to the second side in the second direction y. In the flat membrane element 2 of FIG. 4(b), the lower edge is composed only of an inclined part, and is formed to extend upward from the first side to the second side in the second direction y. In FIGS. 4(a) and 4(b), each of the inclined part of the lower edge of the flat membrane element 2 is formed linearly. On the other hand, as shown in FIG. 4(c), the inclined part of the lower edge of the flat membrane element 2 may be formed curved. In either case, even when contaminants such as fibers and hair are caught on the lower edge of the flat membrane element 2, the contaminants easily move to the second side in the second direction y along the lower edge of the flat membrane element 2.

As shown in FIG. 4(d), it is also preferable the flat membrane element 2 is configured such that an upper edge of the liquid-permeable portion (the portion surrounded by the dashed line) is formed to extend downward from the first side to the second side in the second direction y. When the upper edge of the liquid-permeable portion is formed in this manner, even if gas enters the interior of the flat membrane element 2, the gas that has entered is easily drawn out from the first side of the flat membrane element 2 in the second direction y and gas is less likely to accumulate in the upper part of the liquid-permeable portion, Therefore, a wider part of the filtration membrane 3 can effectively contribute to filtration of the liquid to be treated. The same effect can be obtained when the upper edge of the liquid-permeable portion is formed so as to extend downward and horizontally from the first side to the second side in the second direction y.

In FIG. 1, the aeration means 10 is configured that a larger number of diffusion ports 11 are provided on the first side than on the second side in the second direction y. As a result, more amount of gas can be supplied from the diffuser 10 on the first side than on the second side in the second direction y. When the gas is supplied from the aeration means 10 in this manner, contaminants caught on the lower edge of the flat membrane element 2 further easily move from the first side to the second side in the second direction y by the flow of gas supplied from the aeration means 10.

FIGS. 5 and 6 show another configuration examples of the membrane treatment apparatus of the present invention. In the explanation of the membrane treatment apparatus shown in FIGS. 5 and 6, descriptions overlapping with the above are omitted.

A membrane treatment apparatus 1(1B) shown in FIG. 5 differs from the membrane treatment apparatus 1A shown in FIG. 1 in the configuration of the supporting member 8, the outlet part 6 and the collection part 9. In the membrane treatment apparatus 1B, the supporting member 8 is provided so as to penetrate the plurality of flat membrane elements 2 disposed side by side in the first direction x, whereby the flat membrane elements 2 are held by the supporting member 8. Two supporting members 8 are provided so as to penetrate upper and lower parts of the end part of the flat membrane element 2 on the first side in the second direction y. The supporting member 8 may be provided in this manner. The part of the flat membrane element 2 which the supporting member 8 penetrates is formed so that the permeated liquid does not leak out of the flat membrane element 2.

In addition, in the membrane treatment apparatus 1B shown in FIG. 5, the collection part 9 is provided separated from the supporting member 8. Each flat membrane element 2 is provided with the outlet part 6 on an end surface thereof on the first side in the second direction y, and the outlet part 6 is provided in communication with the collection part 9. The permeated liquid of the flat membrane element 2 is collected in the collection part 9 through the outlet part 6.

A membrane treatment apparatus 1(1C) shown in FIG. 6 is configured that a partition member 12 is provided in the membrane treatment apparatus 1A shown in FIG. 1. The partition member 12 is provided so as to face an edge of the flat membrane element 2 on the second side in the second direction y and extend in a vertical direction. By providing the partition member 12 in this manner, the upward flow of the liquid to be treated accompanying the flow of gas supplied from the aeration means 10 is formed more strongly between the flat membrane element 2 and the partition member 12. Therefore, after contaminants that have moved along the lower edge of the flat membrane element 2 to the second side in the second direction y escape from the lower edge of the flat membrane element 2, they can easily move upward along the partition member 12 smoothly, and as a result, the contaminants is less likely to get caught on the flat membrane element 2 again.

INDUSTRIAL APPLICABILITY

The membrane treatment apparatus of the present invention can be used for treating domestic wastewater such as sewage and night soil, process wastewater generated by treatment of sewage or night soil, industrial wastewater generated from food factories, paper pulp factories, chemical factories and the like, livestock manure, wastewater generated by treatment of livestock waste such as livestock manure, and the like. The membrane treatment apparatus of the present invention can be also used for taking out treated water from activated sludge by immersing it in activated sludge as in the membrane separation activated sludge process (MBR).

This application claims priority to Japanese Patent Application No, 2020-173503, filed on Oct. 14, 2020 All of the contents of the Japanese Patent Application No. 2020-173503, filed on Oct. 14, 2020 are incorporated by reference herein.

REFERENCE SIGNS LIST 1, 1A, 1B, 1C: membrane treatment apparatus
2: flat membrane element
3: filtration membrane, 3A: first filtration membrane, 3B: second filtration membrane
4: flow passage member 5: joint part
6: outlet part
7: auxiliary member
8: supporting member
9: collection part
10: aeration means
11: diffusion port
12: partition member

The invention claimed is:

1. A membrane treatment apparatus, comprising:
a plurality of flat membrane elements which are immersed in a liquid to be treated, each flat membrane element having a first horizontal direction, a second horizontal direction and a height direction, the first horizontal direction being a thickness direction of the flat membrane element, each flat membrane element having respective membrane surfaces on opposite sides in the first horizontal direction, each membrane surface extending in the second horizontal direction and the height direction, wherein the plurality of flat membrane elements are disposed adjacent to each other in the first horizontal direction so that opposing membrane surfaces of adjacent flat membrane elements face each other in the first horizontal direction;
a supporting member for holding at least one of the flat membrane elements provided at an end part of the at least one of the flat membrane elements on a first side in the second horizontal direction; and
an aeration means provided below the plurality of flat membrane elements,
wherein each flat membrane element extends from the first side in the second horizontal direction to a second side in the second horizontal direction, and a lower edge of each flat membrane element is formed
to extend upward from the first side to the second side along the second horizontal direction, or
to consist of a first portion which extends horizontally in the second horizontal direction from the first side toward the second side, and a second portion which extends upward from the first portion to the second side along the second horizontal direction.

2. The membrane treatment apparatus according to claim 1, wherein for each flat membrane element, the respective membrane surfaces on opposite sides in the first horizontal direction comprises
a first filtration membrane on one side in the first horizontal direction,
a second filtration membrane on the other side in the first horizontal direction, and
a flow passage member that is provided between the first filtration membrane and the second filtration membrane and holds a gap between the first filtration membrane and the second filtration membrane, through which a permeated liquid of the first filtration membrane and a permeated liquid of the second filtration membrane flow.

3. The membrane treatment apparatus according to claim 2, wherein
each flat membrane element is configured such that lower edges of the first filtration membrane, the second filtration membrane and the flow passage member are formed
to extend upward from the first side to the second side along the second horizontal direction, or
to consist of a first portion which extends horizontally in the second horizontal direction from the first side toward the second side, and a second portion which extends upward from the first portion to the second side along the second horizontal direction.

4. The membrane treatment apparatus according to claim 2, wherein
each flat membrane element comprises an auxiliary member at a lower end thereof, and
a lower edge of the auxiliary member is formed
to extend upward from the first side to the second side along the second horizontal direction, or
to consist of a first portion which extends horizontally in the second horizontal direction from the first side toward the second side, and a second portion which extends upward from the first portion to the second side along the second horizontal direction.

5. The membrane treatment apparatus according to claim 1, wherein
each flat membrane element has a liquid-impermeable portion on a peripheral part of each membrane surface and a liquid-permeable portion on an inner region of the peripheral part, and
an upper edge of the liquid-permeable portion is formed
to extend downward from the first side to the second side along the second horizontal direction, or
to consist of a first portion which extends horizontally in the second horizontal direction from the first side toward the second side, and a second portion which extends downward from the first portion to the second side along the second horizontal direction.

6. The membrane treatment apparatus according to claim 1, wherein
the supporting member is a single supporting member which holds all of the flat membrane elements of the plurality of flat membrane elements.

7. The membrane treatment apparatus according to claim 1, wherein
the supporting member is one of a plurality of supporting members, and wherein each flat membrane element of the plurality of the flat membrane elements is held by a respective supporting member of the plurality of supporting members.

8. The membrane treatment apparatus according to claim 1, wherein
each flat membrane element has an outlet part from which a permeated liquid that has passed through a filtration membrane is taken out, and
a collection part is provided in communication with the outlet part.

9. The membrane treatment apparatus according to claim 8, wherein
the supporting member also serves as the collection part.

10. The membrane treatment apparatus according to claim 1, wherein
the lower edge of at least one of the plurality of flat membrane elements is higher than the lower edge of an adjacent flat membrane element.

11. The membrane treatment apparatus according to claim 1, further comprising
a vertically extending partition member provided so as to face an edge of each of the flat membrane elements on the second side in the second horizontal direction.

12. The membrane treatment apparatus according to claim 1, wherein
the aeration means is set so that the amount of air diffusion is greater on the first side than on the second side in the second horizontal direction.

13. The membrane treatment apparatus according to claim 1, wherein the supporting member is provided only at an end part of the plurality of flat membrane elements on the first side in the second horizontal direction, and is not provided at an end part of the plurality of flat membrane elements on the second side in the second horizontal direction.

\* \* \* \* \*